US008165026B2

(12) United States Patent
Gholmieh et al.

(10) Patent No.: US 8,165,026 B2
(45) Date of Patent: Apr. 24, 2012

(54) METHOD AND APPARATUS TO REPORT AND MANAGE CELLS IN A MULTI CARRIER SYSTEM

(75) Inventors: Aziz Gholmieh, Del Mar, CA (US); Danlu Zhang, San Diego, CA (US); Sharad Deepak Sambhwani, San Diego, CA (US); Mehmet Yavuz, San Diego, CA (US); Bibhu Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 12/410,267

(22) Filed: Mar. 24, 2009

(65) Prior Publication Data

US 2009/0245178 A1 Oct. 1, 2009

Related U.S. Application Data

(60) Provisional application No. 61/039,164, filed on Mar. 25, 2008.

(51) Int. Cl.
*H04L 12/28* (2006.01)
(52) U.S. Cl. ............... 370/241; 370/328; 370/395.4; 455/67.11; 455/423
(58) Field of Classification Search .............. None
See application file for complete search history.

(56) References Cited

U.S. PATENT DOCUMENTS

| 2006/0128312 | A1* | 6/2006 | Declerck et al. | 455/67.11 |
| 2007/0047552 | A1* | 3/2007 | Astely | 370/395.4 |
| 2007/0104174 | A1* | 5/2007 | Nystrom et al. | 370/343 |
| 2008/0151743 | A1* | 6/2008 | Tong et al. | 370/204 |
| 2008/0299985 | A1 | 12/2008 | Yang et al. | 455/452.2 |

FOREIGN PATENT DOCUMENTS

| RU | 2314649 C2 | 1/2008 |
| WO | WO 2004073256 A1 | 8/2004 |
| WO | WO 2004080102 A1 | 9/2004 |
| WO | WO2007003122 | 1/2007 |

OTHER PUBLICATIONS

Guo, "Advances in mobile radio access networks" Jan. 1, 2004, Artech, USA, XP002580182, pp. 84-88, paragraph [4.5.1]—paragraph [4.5.2].
International Search Report and Written Opinion—PCT/US09/038259, International Search Authority—European Patent Office, May 12, 2010.

* cited by examiner

*Primary Examiner* — Chi H. Pham
*Assistant Examiner* — Shick Hom
(74) *Attorney, Agent, or Firm* — D. Scott Juneau

(57) ABSTRACT

Methods and apparatuses for facilitating managing cells in a multi-carrier system from an access terminal and base station are provided. The base station and access terminal communicate via an anchor carrier and a supplementary carrier. A triggering algorithm generated by the base station is transmitted to the access terminal. The triggering algorithm includes instructions for the access terminal to report downlink measurements as a function of trigger events detected over the anchor carrier and/or the supplementary carrier. Downlink measurements taken by the access terminal are provided to the base station. Cell management instructions based in part on the downlink measurements are then provided to the access terminal by the base station.

50 Claims, 12 Drawing Sheets

ACCESS TERMINAL UNIT

PROCESSOR COMPONENT 610

MEMORY COMPONENT 620

COMM. COMPONENT 630

MEASURING COMPONENT 640

TRIGGER COMPONENT 650

MANAGEMENT COMPONENT 660

TIMING COMPONENT 670

METHOD AND APPARATUS TO REPORT AND MANAGE CELLS IN A MULTI CARRIER SYSTEM

CROSS-REFERENCE TO RELATED APPLICATIONS

This application claims the benefit of U.S. Provisional Patent application Ser. No. 61/039,164 entitled "METHODS AND APPARATUS TO REPORT AND MANAGE CELLS IN A MULTI CARRIER SYSTEM," which was filed Mar. 25, 2008.

BACKGROUND

I. Field

The present application relates generally to wireless communications, and more specifically to methods and systems to facilitate managing cells in a multi-carrier system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), High Speed Packet (HSPA, HSPA+), and others. Moreover, wireless communication systems can be designed to implement one or more standards, such as IS-95, CDMA2000, IS-856, W-CDMA, TD-SCDMA, and the like.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Recent studies have focused on the feasibility of scheduling across two HSDPA carriers. Such research has been particularly focused on utilizing such a scheduling scheme to increase the peak data rates per user and to better utilize available resources by multiplexing carriers in CELL DCH state. This dual carrier approach is commonly referred to as DC-HSDPA (Dual Cell HSDPA or Dual Carrier HSDPA), wherein DC-HSDPA offers both higher resource utilization efficiency and frequency selectivity in order to achieve better performance gains particularly for UEs experiencing poor channel conditions.

Current cell management schemes for DC-HSDPA systems do not allow base stations to take into account downlink conditions as measured by a UE. Such schemes undesirably force base stations perform cell management functions without knowledge of real-time downlink conditions experienced by the UE. It would thus be desirable to have a method and apparatus for facilitating managing cells in a multi-carrier system as a function of downlink measurements taken by the UE.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating managing cells in a multi-carrier system. In one aspect, a method, apparatus, and computer program product is disclosed for facilitating managing cells in a multi-carrier system from a base station. Within such embodiment, the base station communicates with an access terminal via at least one of an anchor carrier or a supplementary carrier. A triggering algorithm is generated which includes instructions for the access terminal to report downlink measurements as a function of detecting trigger events occurring over at least one of the anchor carrier or the supplementary carrier. The triggering algorithm is then transmitted to the access terminal and downlink measurements from the access terminal are subsequently received. Cell management instructions based in part on the downlink measurements are then provided to the access terminal.

In another aspect, a method, apparatus, and computer program product is disclosed for facilitating managing cells in a multi-carrier system from an access terminal. Within such embodiment, an access terminal communicates with a base station via at least one of an anchor carrier or a supplementary carrier. The access terminal is configured with a triggering algorithm received from the base station that includes instructions for determining whether to report downlink measurements taken by the access terminal. The access terminal detects trigger events defined by a triggering algorithm which occur over the anchor carrier. Downlink measurements are then reported to the base station upon detecting the trigger events and a response is subsequently received from the base station which includes cell management instructions based in part on the downlink measurements.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
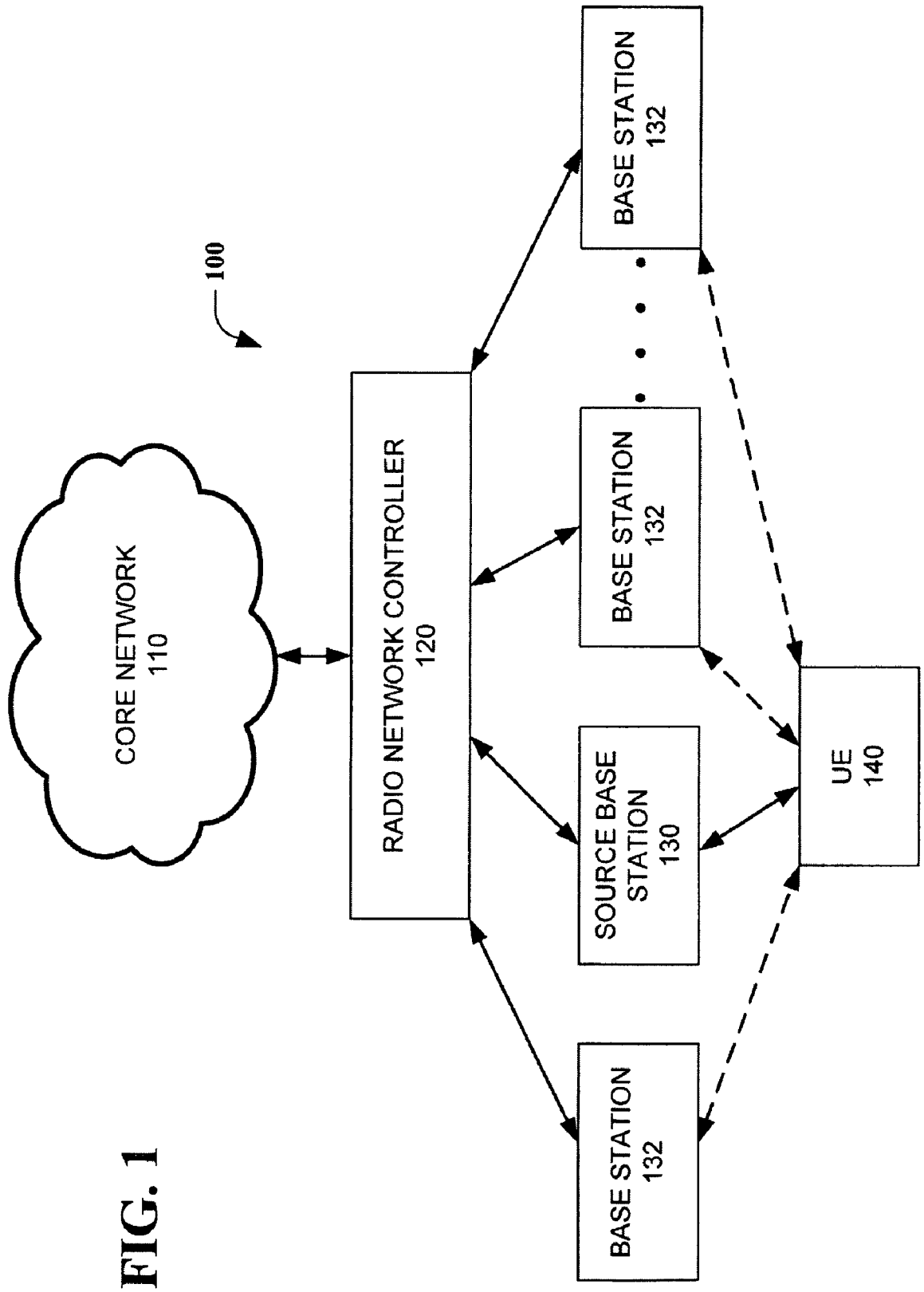
FIG. 1 is an illustration of an exemplary wireless communication system for facilitating managing cells in a multi-carrier system in accordance with an embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring next to FIG. 1, an illustration of an exemplary wireless communication system for facilitating managing cells in a multi-carrier system in accordance with an embodiment is provided. As illustrated, system 100 may include a radio network controller (RNC) 120 in communication with core network 110 and each of a plurality of base stations 130 and 132 in an active set. Within such embodiment, RNC 120 receives downlink data packets from core network 110 and relays them to UE 140 via base stations 130 and 132. For this particular example, although base station 132 is shown to be the current source base station, serving cell changes to one of base stations 130, as well as active set updates, may be facilitated according to downlink measurements provided by UE 140.

In an embodiment, system 100 facilitates dual carrier communications between UE 140 and base stations 130 and 132, wherein an "anchor carrier" and a "supplementary carrier" are utilized to facilitate such communications. To this end, it should be appreciated that an anchor carrier is defined as the downlink frequency carrier associated with an uplink frequency carrier assigned to the UE during dual carrier operation in CELL_DCH, whereas a supplementary carrier is defined as the downlink frequency carrier which is not the anchor carrier. In an aspect, the anchor carrier and the supplementary carrier have the same time reference and their downlinks are synchronized, wherein the serving cell is the same on both carriers. Here, it should be appreciated that the downlink queues at base stations 130 and 132 could be operated in a joint or disjoint manner for the two carriers. Similarly, scheduling over the two downlink carriers may be joint or disjoint.

In another aspect, a "sector" is defined as one or more cells belonging to the same base station and covering the same geographical area. Under this definition, it should be appreciated that the sectors facilitating DC-HSDPA communications may support the deployment of hotspots. Namely, the UTRAN shall be able to assign HSDPA channels on one or both carriers from any sector in the active set. For example, it shall be possible to assign an active set containing sectors A and B, wherein sector A operates with DC-HSDPA and sector B operates with a single carrier HSDPA.

In yet another aspect, legacy UE operation is not impacted by the introduction of DC-HSDPA in system 100. In particular, it should still be possible to operate a UE in MIMO mode on either of the two carriers, while another UE could be in DC-HSDPA mode using these two carriers.

Figure 2:
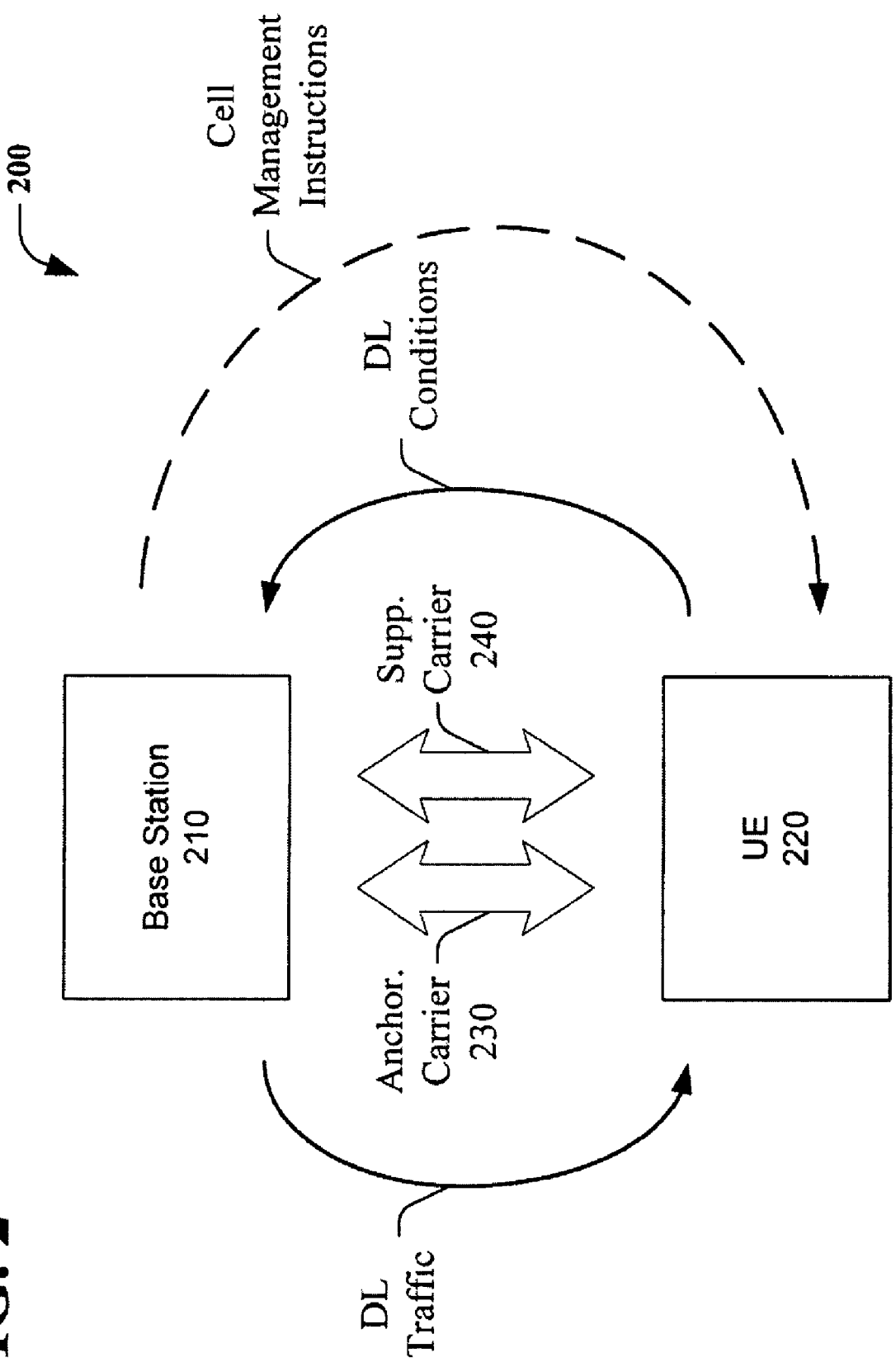
FIG. 2 is an illustration of an exemplary dual carrier communication in accordance with an embodiment.

In FIG. 2, an illustration of an exemplary dual carrier communication between a base station and a UE in accordance with an embodiment is provided. As illustrated, system 200 includes base station 210 communicating with UE 220 via anchor carrier 230 and supplementary carrier 240. In an aspect, downlink traffic flows from base station 210 to UE 220 as shown. As UE 220 receives data from base station 210, downlink conditions are monitored and reported by UE 220 according to a particular triggering scheme. In an embodiment, the triggering scheme executed by UE 220 is provided/updated by base station 210. Here, depending on the particular triggering scheme, UE 220 may report downlink conditions based on trigger events detected over an anchor receiver assigned to anchor carrier 230 and/or a supplementary receiver assigned to supplementary carrier 240. Base station 210 then processes the downlink conditions reported by UE 220 to ascertain whether any cell management modifications are needed (e.g., updating an active set, changing serving cells, etc.). If needed, cell management instructions to implement such modifications are transmitted to UE 220 as shown.

Figure 3:
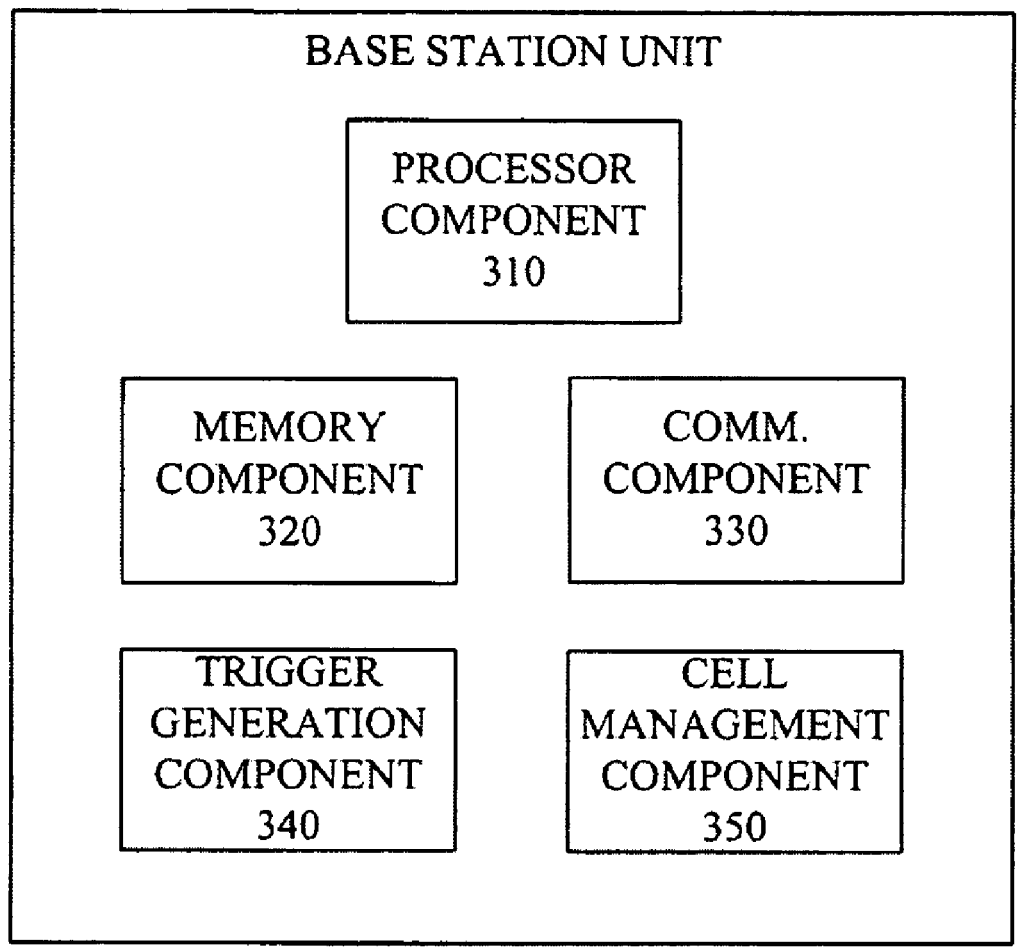
FIG. 3 is a block diagram of an exemplary base station unit in accordance with an embodiment.

Referring next to FIG. 3, a block diagram of an exemplary base station unit in accordance with an embodiment is provided. As illustrated, base station unit 300 may include processor component 310, memory component 320, communication component 330, trigger generation component 340, and cell management component 350.

In one aspect, processor component 310 is configured to execute computer-readable instructions related to performing any of a plurality of functions. Processor component 310 can be a single processor or a plurality of processors dedicated to analyzing information to be communicated from base station unit 300 and/or generating information that can be utilized by memory component 320, communication component 330, trigger generation component 340, and/or cell management component 350. Additionally or alternatively, processor component 310 may be configured to control one or more components of base station unit 300.

In another aspect, memory component 320 is coupled to processor component 310 and configured to store computer-readable instructions executed by processor component 310. Memory component 320 may also be configured to store any of a plurality of other types of data including data generated by any of communication component 330, trigger generation component 340, and/or cell management component 350. Memory component 320 can be configured in a number of different configurations, including as random access memory, battery-backed memory, hard disk, magnetic tape, etc. Various features can also be implemented upon memory component 320, such as compression and automatic back up (e.g., use of a Redundant Array of Independent Drives configuration).

As illustrated, base station unit 300 also includes communication component 330 which is coupled to processor component 310 and configured to interface base station unit 300 with external entities. In a particular embodiment, communication component 330 is configured to facilitate communications between the base station unit 300 and an access terminal via an anchor carrier and/or a supplementary carrier. For instance, communication component 330 may be utilized to receive downlink measurements taken by an access terminal over the anchor carrier and/or supplementary carrier. Communication component 330 may also be utilized to transmit a triggering algorithm to the access terminal, as well as cell management instructions (e.g., active set updates, serving cell changes, etc.). In an embodiment, communication component 330 is further configured to utilize a common time reference for the anchor carrier and the supplementary carrier so as to synchronize downlink transmissions on the anchor carrier with downlink transmissions on the supplementary carrier In another aspect, base station unit 300 also includes trigger generation component 340. Here, trigger generation component 340 is configured to generate a triggering algorithm that is provided to the access terminal. Within such embodiment, the triggering algorithm includes instructions for the access terminal to report downlink measurements as a function of detecting trigger events occurring over the anchor carrier and/or the supplementary carrier.

It should be appreciated that trigger generation component 340 may generate different types of triggering algorithms that monitor any of various types of trigger events. For instance, the triggering algorithm may be generated to include instructions for the access terminal to detect trigger events exclusively over the anchor carrier. Upon detecting an anchor carrier trigger event, the triggering algorithm may instruct the access terminal to report downlink measurements taken either exclusively over the anchor carrier, or over both the anchor carrier and the supplementary carrier.

In another embodiment, trigger generation component 340 is configured to generate a triggering algorithm in which the access terminal detects trigger events over both the anchor carrier and the supplementary carrier. Here, although downlink measurements taken from both the anchor carrier and the supplementary carrier may be reported after each detected trigger even, such a reporting scheme may be inefficient since some of the trigger events may be duplicative. To overcome this inefficiency, the triggering algorithm may be generated to instruct the access terminal to ascertain an elapsed time between detecting a first trigger event (e.g., on the anchor carrier) and a second trigger event (e.g., on the supplementary carrier), wherein the downlink measurements associated with the second trigger event are reported together with downlink measurements associated with the first trigger event only if the elapsed time does not exceed a time threshold.

Trigger generation component 340 may also be configured to generate a triggering algorithm in which the access terminal is instructed to report measurements taken exclusively over the supplementary carrier according to trigger events occurring exclusively over the supplementary carrier. In an embodiment, such a triggering algorithm is utilized to facilitate performing compressed mode operations in parallel with taking downlink measurements. Namely, instead of discontinuing reception during downlink compressed mode, an access terminal can use the receiver assigned to the supplementary carrier to perform the requested measurements. In the meantime, downlink power control and downlink data transmission on the anchor carrier can continue uninterrupted. Accordingly, although such an algorithm disables dual carrier reception, it does not affect downlink power control or data transmission from the anchor carrier.

In yet another aspect, base station unit 300 further includes cell management component 350, which is configured to generate cell management instructions provided to an access terminal. Within such embodiment, the cell management instructions are based in part on downlink measurements received from the access terminal which were triggered by a triggering algorithm provided by the base station. The cell management instructions may include any of several types of cell management instructions including instructions for updating an active set, changing a serving cell, or enabling/disabling the supplementary carrier.

Figure 4:
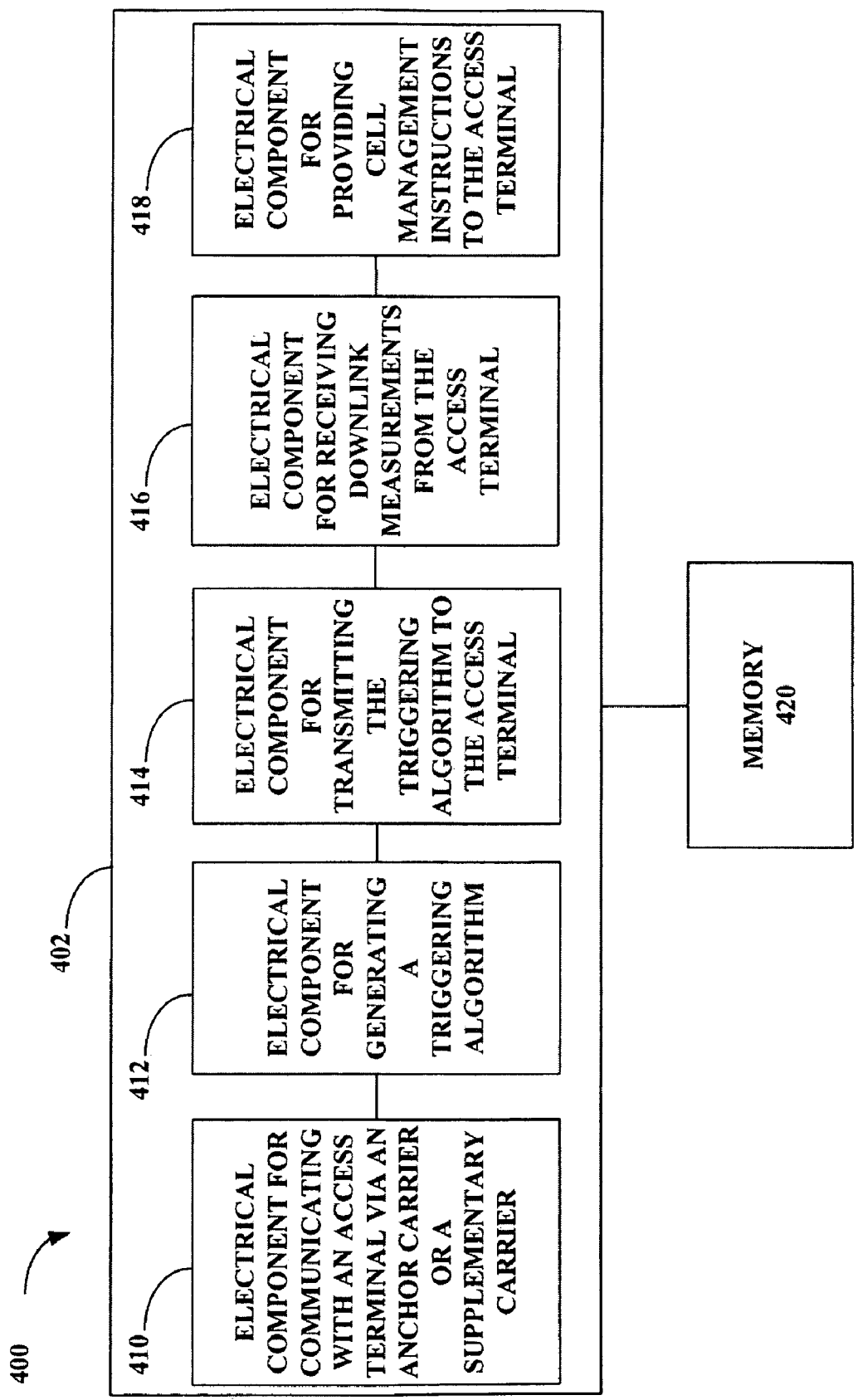
FIG. 4 is an illustration of an exemplary coupling of electrical components that effectuate managing cells in a multi-carrier wireless system from a base station.

Turning to FIG. 4, illustrated is a system 400 that facilitates managing cells in a multi-carrier system. System 400 can reside within a base station, for instance. As depicted, system 400 includes functional blocks that can represent functions implemented by a processor, software, or combination thereof (e.g., firmware). System 400 includes a logical grouping 402 of electrical components that can act in conjunction. As illustrated, logical grouping 402 can include an electrical component for communicating with an access terminal via an anchor carrier or a supplementary carrier 410 and an electrical component for generating a triggering algorithm 412. Further, logical grouping 402 can include an electrical component for transmitting the triggering algorithm to the access terminal 414. Logical grouping 402 can also include an electrical component for receiving downlink measurements from the access terminal 416, as well as an electrical component for providing cell management instructions to the access terminal 418. Additionally, system 400 can include a memory 420 that retains instructions for executing functions associated with electrical components 410, 412, 414, 416, and 418. While shown as being external to memory 420, it is to be understood that electrical components 410, 412, 414, 416, and 418 can exist within memory 420.

Figure 5:
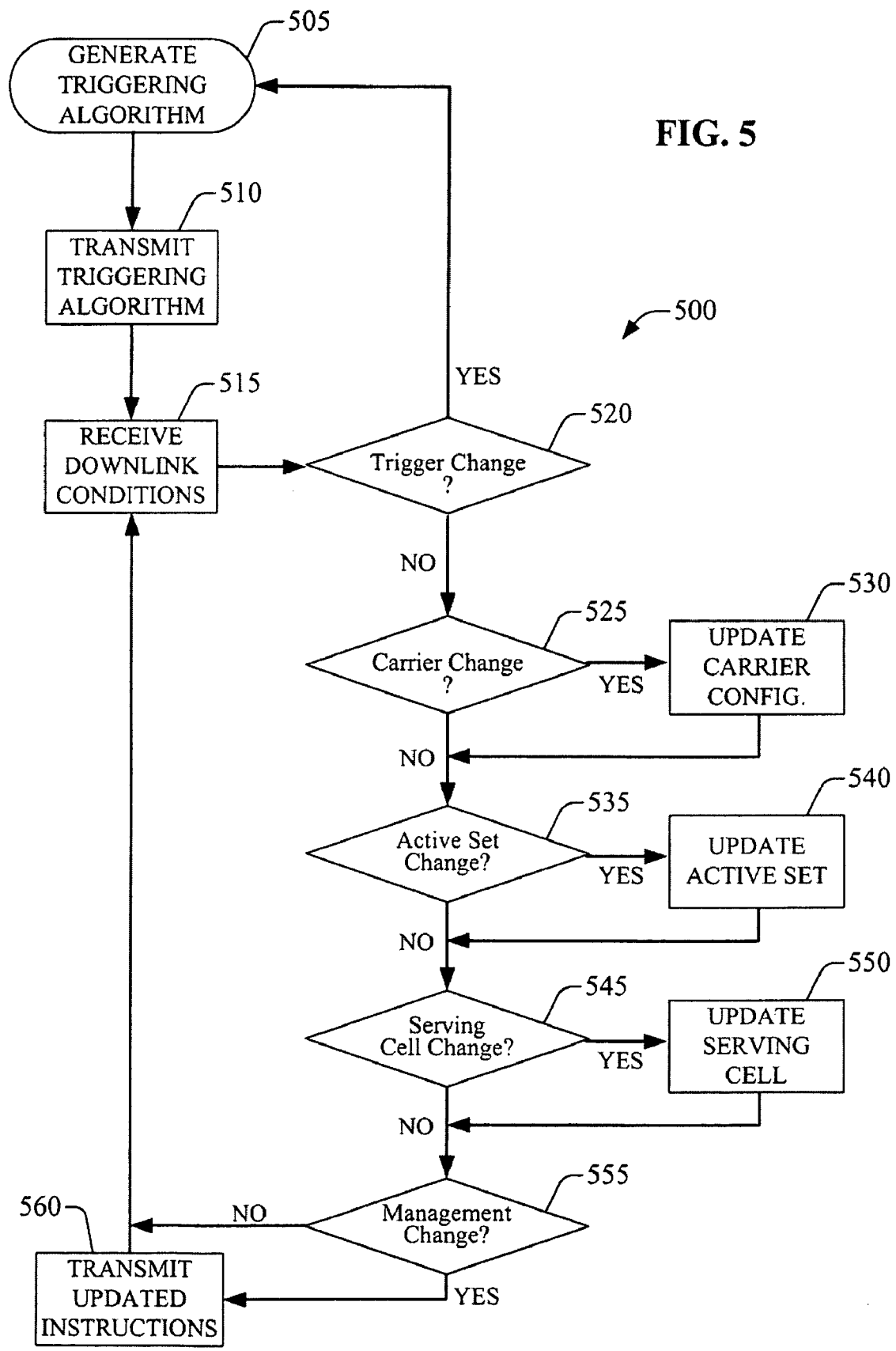
FIG. 5 is a flow chart illustrating an exemplary methodology for facilitating managing cells in a multi-carrier wireless system from a base station.

In FIG. 5, a flow chart is provided illustrating an exemplary methodology for facilitating managing cells in a multi-carrier system from base station. As illustrated, process 500 begins at step 505 where a triggering algorithm is generated and subsequently transmitted to an access terminal at step 510. Here, it should be noted that any of the aforementioned triggering algorithms may be generated/transmitted. For instance, such triggering algorithms may define trigger events and dictate whether these trigger events should be monitored on the anchor carrier and/or the supplementary carrier. The triggering algorithms may also dictate whether measurements should be reported from the anchor carrier and/or the supplementary carrier, as well as whether a "throttled" reporting of measurements triggered from both carriers should be implemented.

After transmitting the triggering algorithm at step 510, process 500 continues to step 515 where the base station receives downlink measurements from the access terminal. Once received, the base station may then utilize the downlink measurements to ascertain which of a plurality of management commands should be transmitted to the access terminal, if any. For instance, a determination may be made at step 520 as to whether a new triggering algorithm should be generated at step 505 based on the current downlink conditions.

If a new triggering algorithm is not desired at step 520, a series of subsequent determinations are made as to whether other management commands are desirable, wherein such commands may be simultaneously transmitted to the access terminal. At step 525, for example, a determination is made regarding whether to toggle between single and dual carrier operation. By allowing the base station to enable/disable the supplementary carrier based on the downlink traffic and channel conditions, such a feature is particularly desirable for purposes of saving power at the access terminal. To this end, HS-SCCH orders could be used to provide such a mechanism. If it is determined that either of the anchor carrier or the supplementary carrier should be enabled/disabled, such command is saved at step 530 for subsequent transmission to the access terminal.

As illustrated, after determining whether to toggle between single and dual carrier operation at step 525 and, if necessary, logging such commands at step 530, process 500 continues with a determination of whether to perform an active set update at step 535. For instance, under some downlink conditions, it may be desirable for a base station to assign an active set that includes a first sector and a second sector, wherein the first sector is configured to communicate with the access terminal via a single carrier, and wherein the second sector is configured to communicate with the access terminal via dual carriers. If it is determined that an active set update command is necessary, such command is saved for subsequent transmission at step 540, wherein process 500 proceeds to step 545 thereafter. Otherwise, if an active set update is not necessary, process 500 proceeds directly to step 545 from step 535.

At step 545, a determination is made of whether the current serving cell of the access terminal needs to be changed. If it is determined that the serving cell should indeed be changed, an access terminal command indicating such change is logged at step 550. Process 500 then proceeds to step 555 where the base station determines whether any commands have been made logged at either of steps 530, 540, or 550. If no commands were logged, process 500 loops back to step 515 where the base station continues to receive downlink measurements from the access terminal. However, if commands were indeed logged, such commands are gathered and simultaneously transmitted to the access terminal at step 560 just before process 500 loops back to step 515. Here, although described as being transmitted simultaneously, it should be appreciated that these commands may also be transmitted separately.

Figure 6:
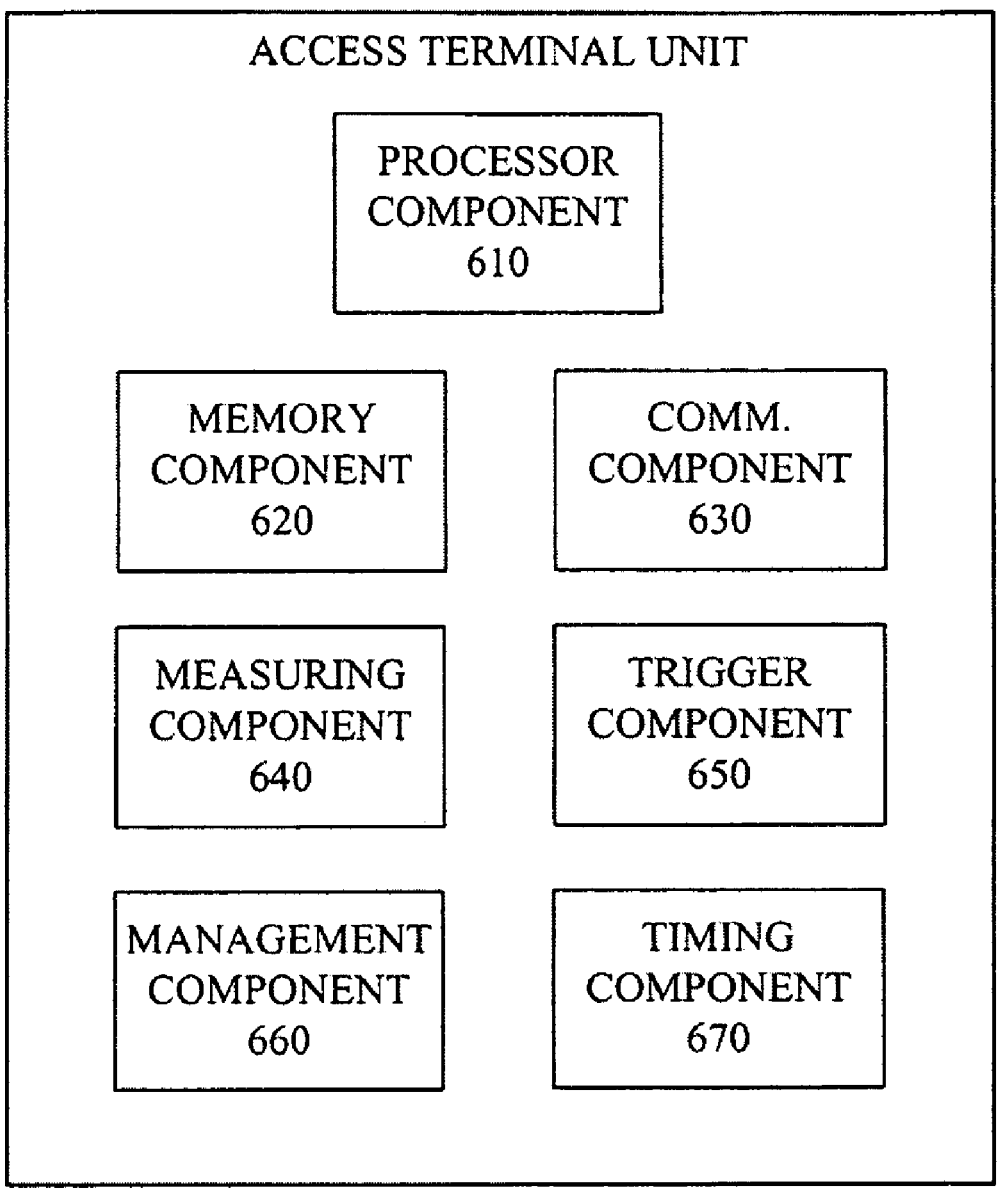
FIG. 6 is a block diagram of an exemplary access terminal unit in accordance with an embodiment.

Referring next to FIG. 6, a block diagram of an exemplary access terminal unit in accordance with an embodiment is provided. As illustrated, base station unit 600 may include processor component 610, memory component 620, communication component 630, measurement component 640, trigger component 650, management component 660, and timing component 670.

Similar to processor component 310 in base station unit 300, processor component 610 is configured to execute computer-readable instructions related to performing any of a plurality of functions. Processor component 610 can be a single processor or a plurality of processors dedicated to analyzing information to be communicated from access terminal unit 600 and/or generating information that can be utilized by memory component 620, communication component 630, measurement component 640, trigger component 650, management component 660, and/or timing component 670. Additionally or alternatively, processor component 610 may be configured to control one or more components of access terminal unit 600.

In another aspect, memory component 620 is coupled to processor component 610 and configured to store computer-readable instructions executed by processor component 610. Memory component 620 may also be configured to store any of a plurality of other types of data including data generated by any of communication component 630, measurement component 640, trigger component 650, management component 660, and/or timing component 670. Here, it should be noted that memory component 620 is analogous to memory component 320 in base station unit 300. Accordingly, it should be appreciated that any of the aforementioned features/configurations of memory component 320 are also applicable to memory component 620.

Similar to communication component 330 in base station unit 300, communication component 630 is coupled to processor component 610 and configured to interface access terminal unit 600 with external entities. In a particular embodiment, communication component 630 is configured to facilitate communications between the access terminal unit 600 and a base station via an anchor carrier and/or a supplementary carrier. For instance, communication component 630 may be utilized to transmit downlink measurements to the base station, wherein the downlink measurements are taken by access terminal unit 600 over the anchor carrier and/or supplementary carrier. Communication component 630 may also be utilized to receive a triggering algorithm from the base station, as well as cell management instructions (e.g., active set updates, serving cell changes, etc.).

As illustrated, base station unit 600 also includes measurement component 640. In an aspect, measurement component 640 is configured to log downlink conditions ascertained from signals received from a base station. Moreover, the downlink conditions are logged according to measurements taken from the anchor carrier and/or the supplementary carrier.

Access terminal unit 600 may also include trigger component 650, which is configured to detect trigger events occurring over the anchor carrier and/or supplementary carrier. In an aspect, such trigger events are defined by a triggering algorithm received from the base station, wherein the logged downlink conditions are reported to the base station as a function of each trigger event.

It should be appreciated that trigger component 650 may execute different types of triggering algorithms that monitor any of various types of trigger events. For instance, triggering algorithms may be executed in which the access terminal is instructed to detect trigger events exclusively over the anchor carrier. As stated previously with respect to algorithms utilizing such anchor-exclusive triggers, downlink measurements taken either exclusively over the anchor carrier, or over both the anchor carrier and the supplementary carrier, may be transmitted as a function of each trigger event detected.

In another embodiment, trigger component 650 is configured to execute a triggering algorithm in which access terminal unit 600 detects trigger events over both the anchor carrier and the supplementary carrier. Here, as was also stated previously, the triggering algorithm may be executed to instruct access terminal unit 600 to ascertain an elapsed time between detecting a first trigger event (e.g., on the anchor carrier) and a second trigger event (e.g., on the supplementary carrier), wherein the downlink measurements associated with the second trigger event are reported together with downlink measurements associated with the first trigger event only if the elapsed time does not exceed a time threshold. To facilitate such embodiment, access terminal unit 600 may further include timing component 670 to ascertain the elapsed time between triggered events.

Trigger component 650 may also be configured to execute a triggering algorithm in which access terminal unit 600 reports measurements taken exclusively over the supplementary carrier according to a monitoring of trigger events exclusively over the supplementary carrier. As stated previously, such a triggering algorithm may be utilized to facilitate performing compressed mode operations in parallel with taking downlink measurements. Moreover, access terminal unit 600 can perform the requested measurements over the supplementary carrier while downlink power control and downlink data transmission on the anchor carrier continues uninterrupted.

In another aspect, access terminal unit 600 also includes management component 660. Here, management component 660 is configured to execute cell management instructions received from the base station, wherein the cell management instructions are received in response to the downlink conditions reported by access terminal unit 600. As stated previously, the cell management instructions may include any of several types of cell management instructions including instructions for updating an active set, changing a serving cell, or enabling/disabling the supplementary carrier.

Figure 7:
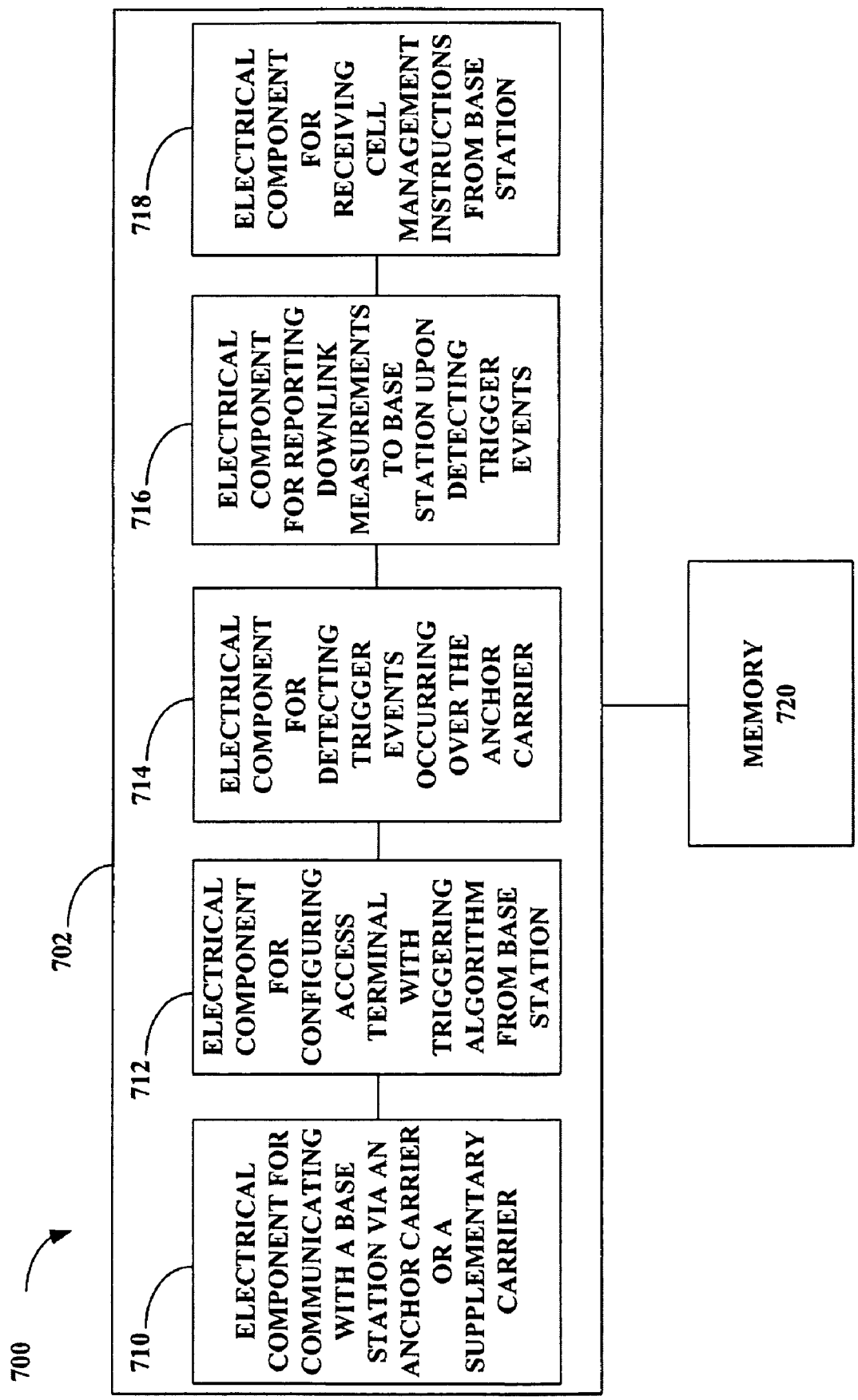
FIG. 7 is an illustration of an exemplary coupling of electrical components that effectuate managing cells in a multi-carrier wireless system from an access terminal.

Referring next to FIG. 7, illustrated is another system 700 that facilitates managing cells in a multi-carrier system. System 700 can reside within an access terminal, for instance. Similar to system 500, system 700 includes functional blocks that can represent functions implemented by a processor, software, or combination thereof (e.g., firmware), wherein system 700 includes a logical grouping 702 of electrical components that can act in conjunction. As illustrated, logical grouping 702 can include an electrical component for communicating with a base station via an anchor carrier or a supplementary carrier 710 and an electrical component for configuring the access terminal with a triggering algorithm received from base station 712. Further, logical grouping 702 can include an electrical component for detecting trigger events occurring over the anchor carrier 714. Logical grouping 702 can also include an electrical component for reporting downlink measurements to the base station upon detecting trigger events 716, as well as an electrical component for receiving cell management instructions from the base station 718. Additionally, system 700 can include a memory 720 that retains instructions for executing functions associated with electrical components 710, 712, 714, 716, and 718, wherein any of electrical components 710, 712, 714, 716, and 718 can exist either within or outside memory 720.

Figure 8:
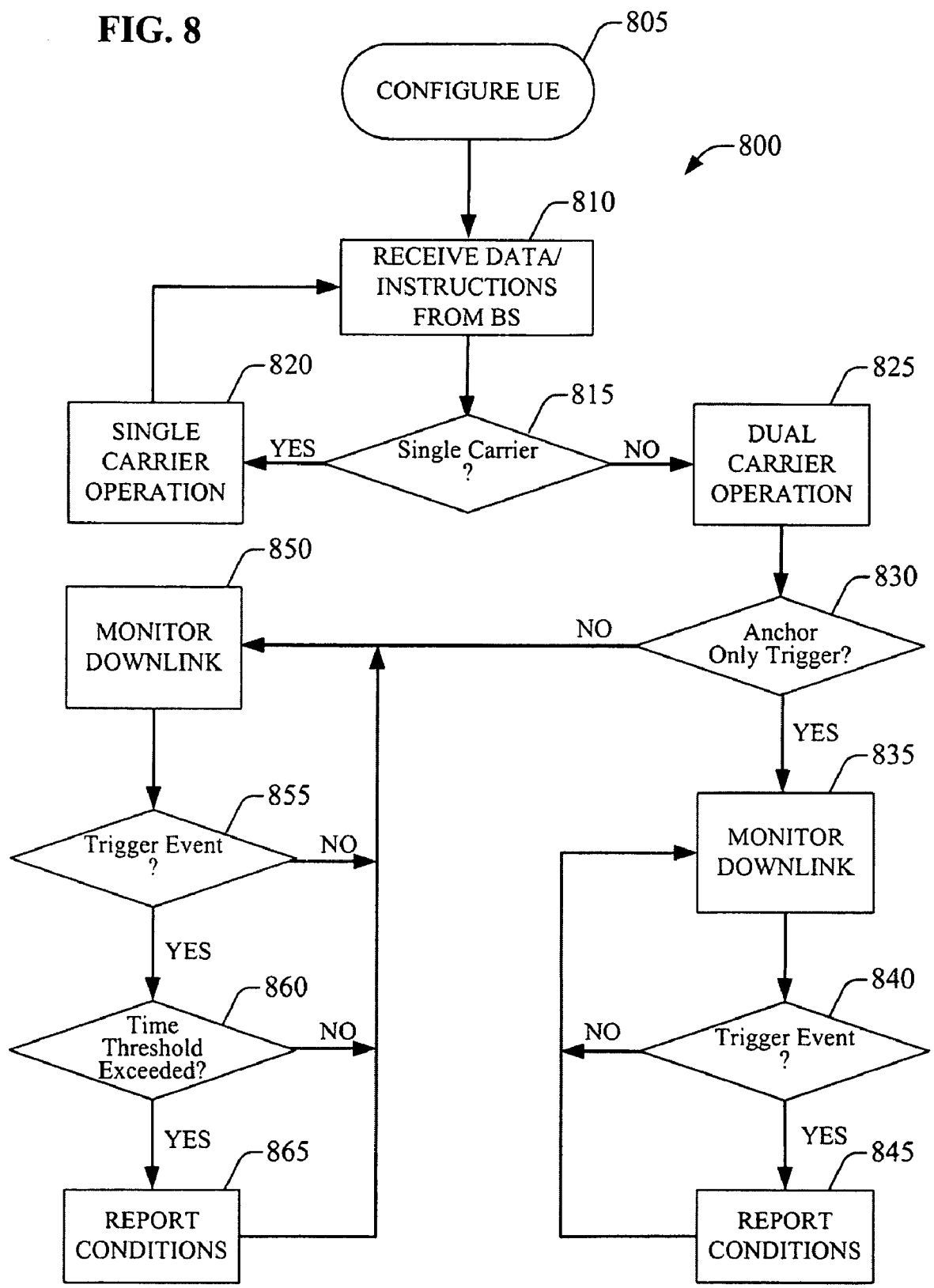
FIG. 8 is a flow chart illustrating an exemplary methodology for facilitating managing cells in a multi-carrier wireless system from an access terminal.

In FIG. 8, a flow chart is provided illustrating an exemplary methodology for facilitating managing cells in a multi-carrier system from an access terminal. As illustrated, process 800 begins at step 805 where the access terminal is configured for dual carrier operation. In an aspect, such configuration step may include receiving configuration data from a base station, wherein a triggering algorithm may be embedded within the configuration data. It should, however, be appreciated that the access terminal may also be configured independent of the base station (e.g., manually and/or preconfigured by manufacturer).

Once configured, the access terminal begins to receive instructions and traffic data from the base station at step 810. Next, at step 805, process 800 continues with a determination of whether communication between the access terminal and the base station will be via a single carrier or a dual carrier. Indeed, as stated previously, instructions received from the base station may include a toggling between single and dual carrier operation in order to save power at the access terminal. If the base station instructions provide for single carrier operation, the supplemental carrier is disabled at step 820, wherein process 800 loops back to receiving data/instructions at step 810.

If dual carrier operation is instructed, process 800 continues to step 825, wherein both the anchor carrier and the supplementary carrier are enabled. At step 830, a determination is then made as to the carrier(s) the base station wanted the access terminal to monitor for trigger events. If the access terminal is instructed to monitor trigger events exclusively on the anchor carrier, process 800 proceeds to step 835. Otherwise, if monitoring trigger events on both the anchor carrier and the supplementary carrier is desired, process 800 proceeds to step 850.

At step 835, with respect to monitoring trigger events exclusively on the anchor carrier, the access terminal proceeds by monitoring the downlink conditions between the base station and the access terminal. Here, it should be noted that monitoring schemes may include logging downlink measurements either exclusively on the anchor carrier or on both the anchor carrier and the supplementary carrier. If a trigger event is detected on the anchor carrier at step 840, downlink measurements, collected either exclusively from the anchor carrier or from both the anchor carrier and the supplementary carrier, are reported to the base station, at step 845. Upon reporting these downlink measurements, process 800 loops back to step 835 where the downlink measurements continue to be monitored. If a trigger event is not detected at step 840, however, process 800 directly loops back to step 835, as illustrated.

At step 850, with respect to monitoring trigger events on the anchor carrier and the supplementary carrier, the access terminal proceeds by monitoring the downlink conditions over both the anchor carrier and the supplementary carrier. If a trigger event is not detected on either the anchor carrier or the supplementary carrier at step 855, process 800 loops back to step 850 where the downlink measurements continue to be monitored. However, if a trigger is indeed detected, a time threshold comparison is made at step 860 to determine whether to report, at step 865, downlink measurements associated with a triggered event detected after a first triggered event. For instance, if a first triggered event is detected, the downlink measurements associated with the triggered event may be reported immediately, wherein downlink measurements associated with a subsequently triggered event is reported only if the elapsed time between the triggered events exceeds a time threshold. In another embodiment, if a first triggered event is detected, downlink measurements associated with a subsequently triggered event are reported together with downlink measurements associated with the first trigger event only if the elapsed time between the triggered events does not exceed a time threshold. Once the downlink measurements have been reported, process 800 loops back to step 850 where the downlink continues to be monitored.

Figure 9:
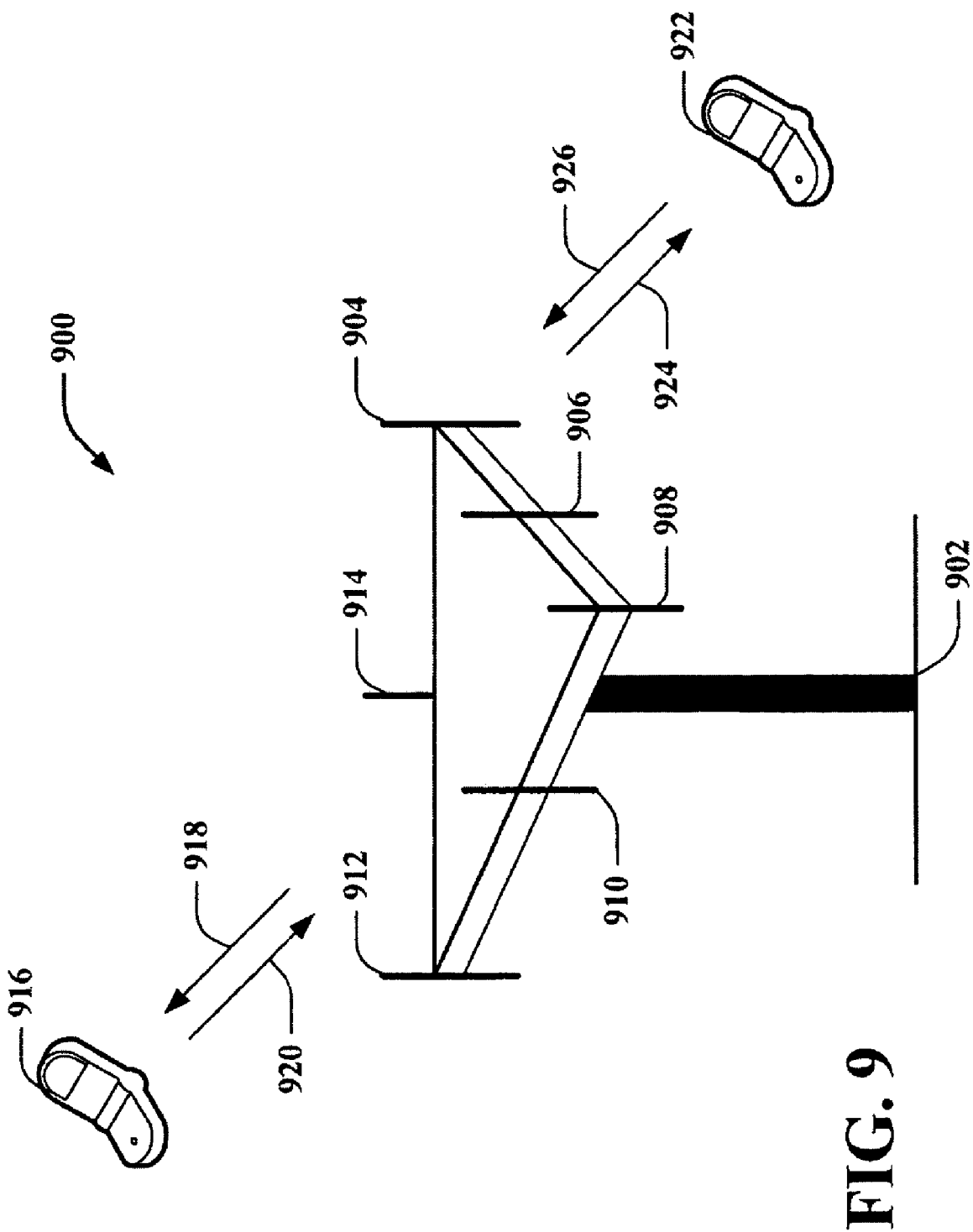
FIG. 9 is an illustration of a wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 902 can communicate with one or more access terminals such as access terminal 916 and access terminal 922; however, it is to be appreciated that base station 902 can communicate with substantially any number of access terminals similar to access terminals 916 and 922. Access terminals 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, access terminal 916 is in communication with antennas 912 and 914, where antennas 912 and 914 transmit information to access terminal 916 over a forward link 918 and receive information from access terminal 916 over a reverse link 920. Moreover, access terminal 922 is in communication with antennas 904 and 906, where antennas 904 and 906 transmit information to access terminal 922 over a forward link 924 and receive information from access terminal 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to access terminals in a sector of the areas covered by base station 902. In communication over forward links 918 and 924, the transmitting antennas of base station 902 can utilize beamforming to improve signal-to-noise ratio of forward links 918 and 924 for access terminals 916 and 922. Also, while base station 902 utilizes beamforming to transmit to access terminals 916 and 922 scattered randomly through an associated coverage, access terminals in neighboring cells can be subject to less interference as compared to a base station transmitting through a single antenna to all its access terminals.

Figure 10:
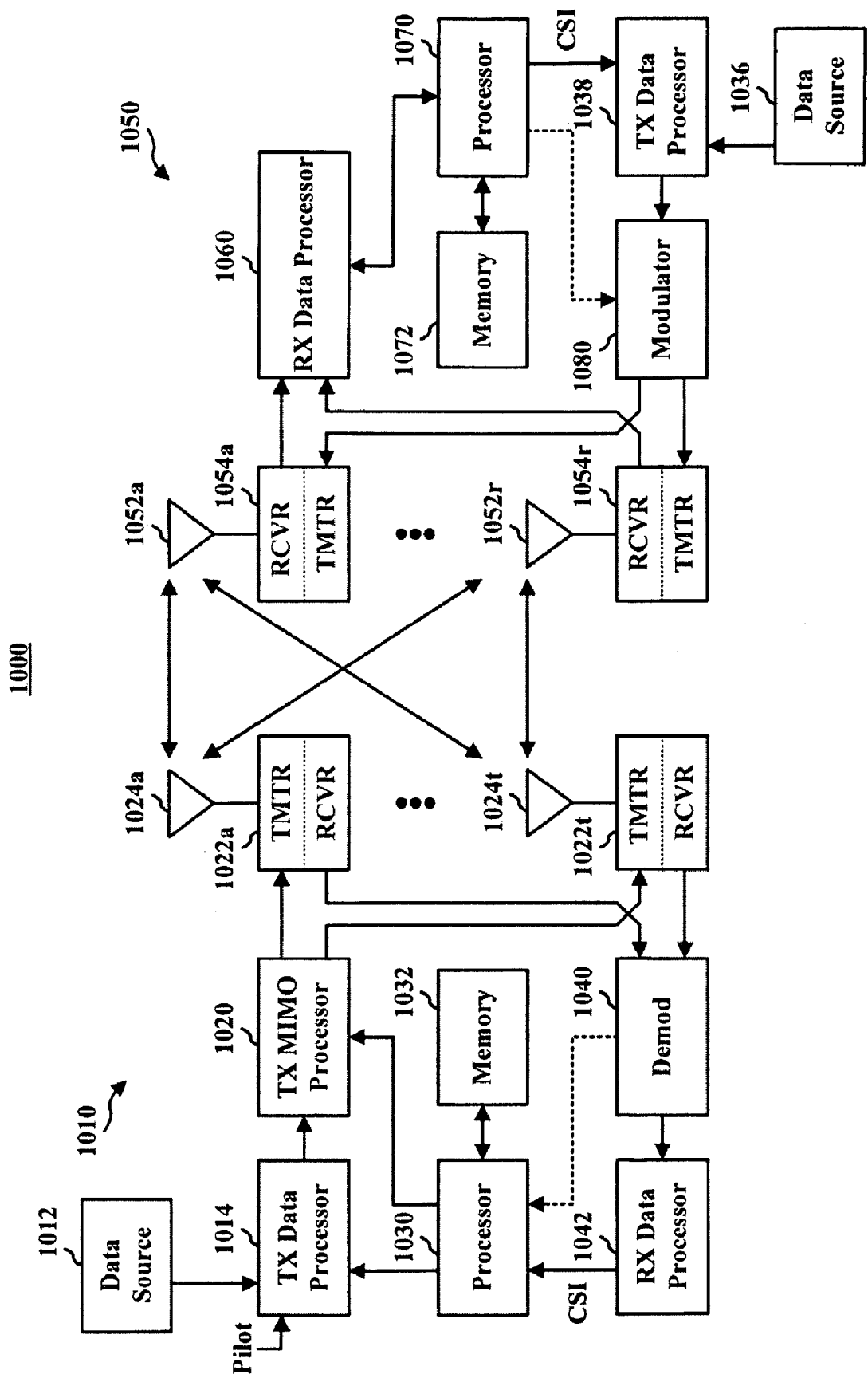
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems and/or methods described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which preceding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

Figure 11:
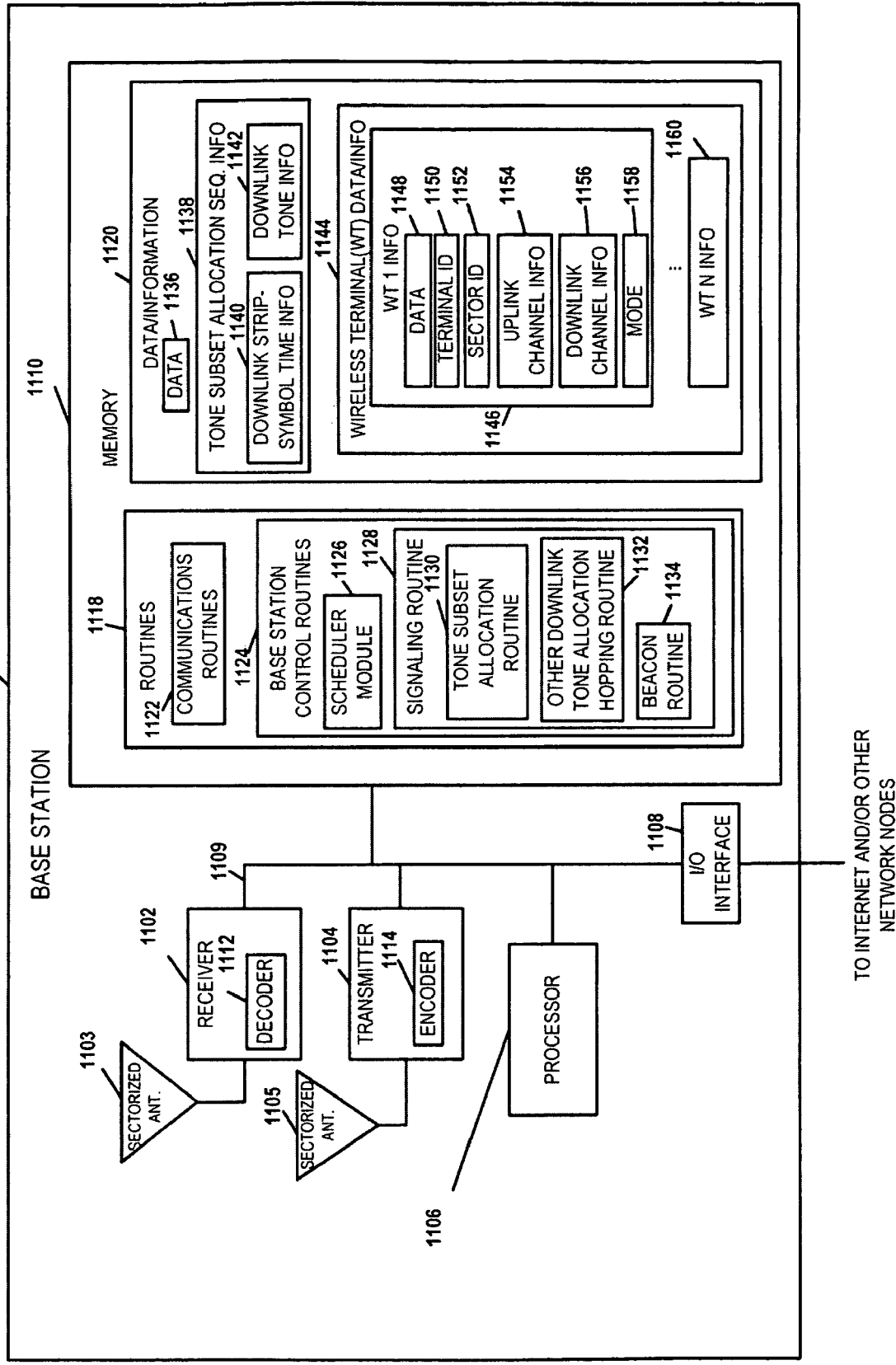
FIG. 11 is an illustration of an exemplary base station in accordance with various aspects described herein.

FIG. 11 illustrates an exemplary base station 1100 in accordance with various aspects. Base station 1100 implements tone subset allocation sequences, with different tone subset allocation sequences generated for respective different sector types of the cell. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receiver 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 11134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 control the base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 12:
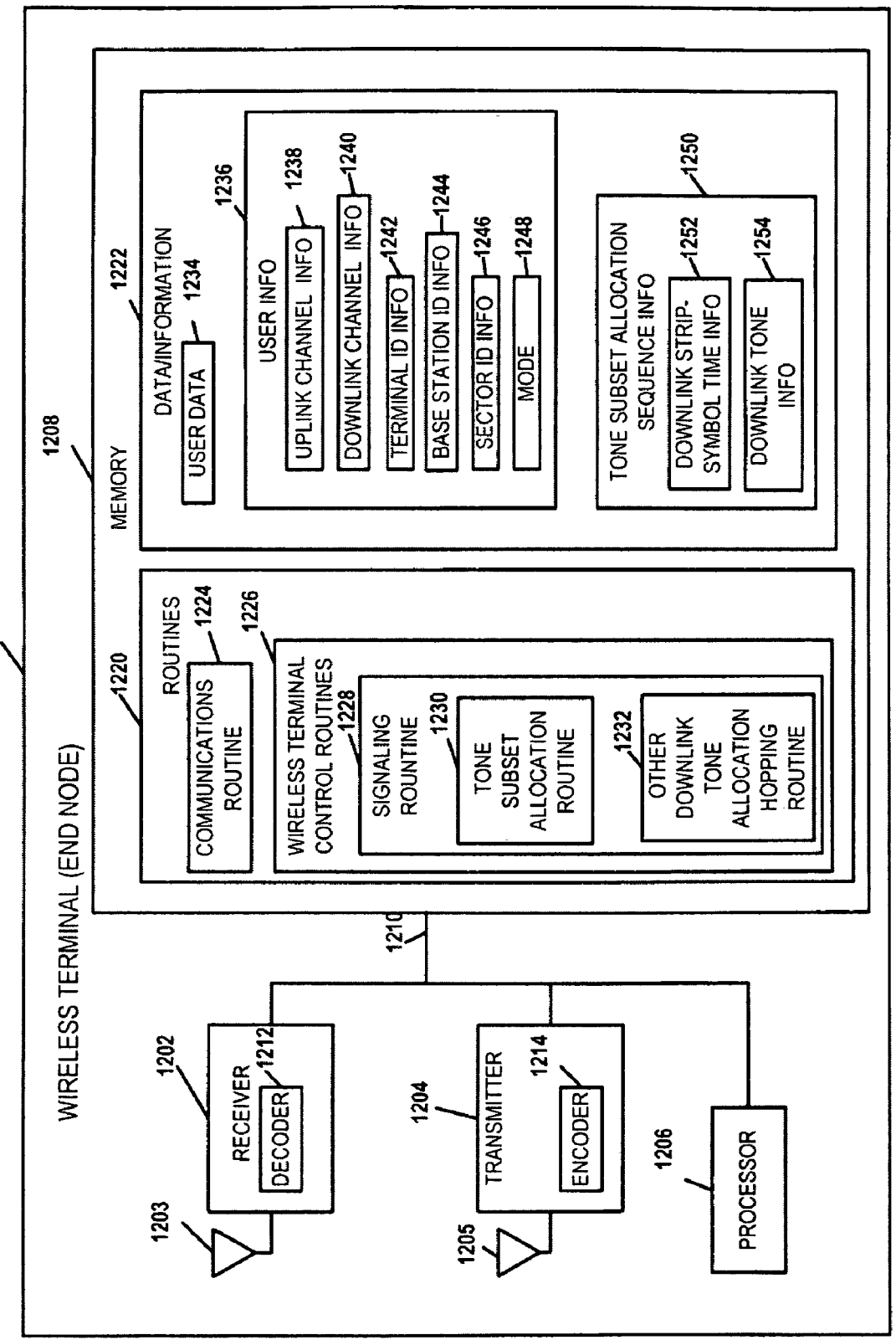
FIG. 12 is an illustration of an exemplary wireless terminal implemented in accordance with various aspects described herein.

FIG. 12 illustrates an exemplary wireless terminal (end node) 1200. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink strip-tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1230 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from a base station. The uplink tone allocation hopping routine 1230 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method for an access terminal in a wireless network to facilitate managing cells in a multi-carrier system, comprising:
    communicating with a base station via at least one of an anchor carrier or a supplementary carrier;
    receiving signals through an anchor receiver assigned to the anchor carrier or a supplementary receiver assigned to the supplementary carrier;
    configuring the access terminal with a triggering algorithm received from the base station, the triggering algorithm including instructions for determining whether to report downlink measurements taken by the access terminal;
    detecting at least one trigger event via the anchor carrier, each of the at least one trigger events defined by the triggering algorithm;
    reporting the downlink measurements to the base station upon detecting each of the at least one trigger events; and
    receiving a response from the base station, the response including cell management instructions based in part on the downlink measurements.

2. The method of claim 1, the cell management instructions including instructions to enable or disable the supplementary carrier.

3. The method of claim 1, the communicating act including communicating with the base station via the anchor carrier and the supplementary carrier.

4. The method of claim 3, the cell management instructions including instructions for the access terminal to perform the following acts:
    temporarily disabling supplementary carrier reception, taking the downlink measurements from the supplementary receiver; and
    detecting each of the at least one trigger events over the supplementary receiver.

5. The method of claim 3, the detecting act occurring exclusively over the anchor carrier.

6. The method of claim 5, the reporting act including reporting downlink measurements taken exclusively over the anchor carrier.

7. The method of claim 5, the reporting act including reporting downlink measurements taken over the anchor carrier and the supplementary carrier.

8. The method of claim 3, the detecting act further comprising detecting each of the at least one trigger events over the supplementary carrier.

9. The method of claim 8 further comprising ascertaining an elapsed time between detecting a first trigger event and a second trigger event, the reporting act including reporting downlink measurements associated with the second trigger event together with downlink measurements associated with the first trigger event only if the elapsed time does not exceed a time threshold.

10. The method of claim 3, the communicating act comprising a joint scheduling of the anchor carrier and the supplementary carrier.

11. The method of claim 3, the communicating act comprising a disjoint scheduling of the anchor carrier and the supplementary carrier.

12. The method of claim 3, the communicating act comprising utilizing a common time reference for each of the anchor carrier and the supplementary carrier, wherein downlink transmissions via the anchor carrier are synchronized with downlink transmissions via the supplementary carrier.

13. The method of claim 3, the communicating act comprising communicating with the base station in MIMO mode via the anchor carrier or the supplementary carrier.

14. An access terminal for facilitating managing cells in a multi-carrier wireless system, comprising:
    a memory component configured to store computer-readable instructions;
    a processing component coupled to the memory component and configured to execute the computer-readable instructions, the instructions including instructions for implementing a plurality of acts on the following components:
        a communication component configured to facilitate communications between the access terminal and a base station via at least one of an anchor carrier or a supplementary carrier, the communication component configured to receive signals through an anchor receiver assigned to the anchor carrier or a supplementary receiver assigned to the supplementary carrier;
        a measurement component configured to log downlink conditions, the downlink conditions logged according to measurements taken from at least one of the anchor carrier or the supplementary carrier;
        a trigger component configured to detect at least one trigger event occurring over the anchor carrier, each of the at least one trigger events defined by a triggering algorithm received from the base station, the downlink conditions reported to the base station as a function of each trigger event; and
        a management component configured to execute cell management instructions received from the base station, the cell management instructions received in response to the downlink conditions reported by the access terminal.

15. The access terminal of claim 14, the management component further configured to execute instructions to enable or disable the supplementary carrier.

16. The access terminal of claim 14, the communication component configured to facilitate communication with the base station via the anchor carrier and the supplementary carrier.

17. The access terminal of claim 16, the management component further configured to execute instructions to perform the following acts:

temporarily disabling supplementary carrier reception on the communication component; and configuring the measuring component to log the downlink conditions according to measurements taken from the supplementary receiver; and configuring the trigger component to detect each of the at least one trigger events over the supplementary receiver.

18. The access terminal of claim 16, the trigger component further configured to detect trigger events exclusively over the anchor carrier.

19. The access terminal of claim 18, the trigger component further configured to report downlink conditions according to measurements taken exclusively over the anchor carrier.

20. The access terminal of claim 18, the trigger component further configured to report downlink conditions according to measurements taken over the anchor carrier and the supplementary carrier.

21. The access terminal of claim 16, the trigger component further configured to detect trigger events over the supplementary carrier.

22. The access terminal of claim 21 further comprising a timing component configured to ascertain an elapsed time between detecting a first trigger event and a second trigger event, the trigger component further configured to report downlink conditions according to measurements associated with the second trigger event together with downlink measurements associated with the first trigger event only if the elapsed time does not exceed a time threshold.

23. A non-transitory computer-readable storage medium comprising:
   code for communicating with a base station via at least one of an anchor carrier or a supplementary carrier;
   code for receiving signals through an anchor receiver assigned to the anchor carrier or a supplementary receiver assigned to the supplementary carrier;
   code for configuring the access terminal with a triggering algorithm received from the base station, the triggering algorithm including instructions for determining whether to report downlink measurements taken by the access terminal;
   code for detecting at least one trigger event via the anchor carrier, each of the at least one trigger events defined by the triggering algorithm;
   code for reporting the downlink measurements to the base station upon detecting each of the at least one trigger events; and
   code for receiving a response from the base station, the response including cell management instructions based in part on the downlink measurements.

24. An apparatus for facilitating managing cells in a multi-carrier system from an access terminal, comprising:
   means for communicating with a base station via at least one of an anchor carrier or a supplementary carrier;
   means for receiving signals through an anchor receiver assigned to the anchor carrier or a supplementary receiver assigned to the supplementary carrier;
   means for configuring the access terminal with a triggering algorithm received from the base station, the triggering algorithm including instructions for determining whether to report downlink measurements taken by the access terminal;
   means for detecting at least one trigger event via the anchor carrier, each of the at least one trigger events defined by the triggering algorithm;
   means for reporting the downlink measurements to the base station upon detecting each of the at least one trigger events; and
   means for receiving a response from the base station, the response including cell management instructions based in part on the downlink measurements.

25. A method for a base station in a wireless network to facilitate managing cells in a multi-carrier system, comprising:
   communicating with an access terminal via at least one of an anchor carrier or a supplementary carrier;
   generating a triggering algorithm, the triggering algorithm including instructions for the access terminal to report downlink measurements as a function of detecting trigger events via at least one of the anchor carrier or the supplementary carrier;
   transmitting the triggering algorithm to the access terminal;
   receiving downlink measurements from the access terminal; and
   providing cell management instructions to the access terminal, the cell management instructions based in part on the downlink measurements.

26. The method of claim 25, the providing act comprising providing the access terminal with instructions to enable or disable the supplementary carrier.

27. The method of claim 25, the communicating act comprising communicating with the access terminal via the anchor carrier and the supplementary carrier.

28. The method of claim 27, the triggering algorithm generated to include instructions for the access terminal to detect the trigger events exclusively over the anchor carrier.

29. The method of claim 28, the triggering algorithm generated to include instructions for the access terminal to report downlink measurements taken exclusively over the anchor carrier.

30. The method of claim 28, the triggering algorithm generated to include instructions for the access terminal to report downlink measurements taken over the anchor carrier and the supplementary carrier.

31. The method of claim 27, the triggering algorithm generated to include instructions for the access terminal to detect the trigger events over the anchor carrier and the supplementary carrier.

32. The method of claim 31, the triggering algorithm generated to include instructions for the access terminal to ascertain an elapsed time between detecting a first trigger event and a second trigger event, wherein the access terminal is instructed to report downlink measurements associated with the second trigger event together with downlink measurements associated with the first trigger event only if the elapsed time does not exceed a time threshold.

33. The method of claim 27, the triggering algorithm generated to include instructions for the access terminal to perform the following acts:
   temporarily disabling supplementary carrier reception;
   taking the downlink measurements exclusively from the supplementary receiver; and
   detecting trigger events exclusively over the supplementary receiver.

34. The method of claim 27, the communicating act comprising utilizing a joint queue for the anchor carrier and the supplementary carrier.

35. The method of claim 27, the communicating act comprising utilizing a disjoint queue for the anchor carrier and the supplementary carrier.

36. The method of claim 27, the communicating act comprising utilizing a common serving cell for the anchor carrier and the supplementary carrier.

37. The method of claim 27, the communicating act comprising utilizing a common time reference for each of the anchor carrier and the supplementary carrier, wherein downlink transmissions via the anchor carrier are synchronized with downlink transmissions via the supplementary carrier.

38. The method of claim 25, the providing act comprising assigning an active set to the access terminal, wherein the active set includes a first sector and a second sector, the first sector configured to communicate with the access terminal via a single carrier, the second sector configured to communicate with the access terminal via dual carriers.

39. A base station for facilitating managing cells in a multi-carrier wireless system, comprising:
- a memory component configured to store computer-readable instructions;
- a processing component coupled to the memory component and configured to execute the computer-readable instructions, the instructions including instructions for implementing a plurality of acts on the following components:
- a communication component configured to facilitate communications between the base station and an access terminal via at least one of an anchor carrier or a supplementary carrier;
- a trigger generation component configured to generate a triggering algorithm provided to the access terminal, the triggering algorithm including instructions for the access terminal to report downlink measurements as a function of detecting trigger events via at least one of the anchor carrier, or the supplementary carrier; and
- a cell management component configured to generate cell management instructions provided to the access terminal, the cell management instructions based in part on downlink measurements received from the access terminal according to the triggering algorithm.

40. The base station of claim 39, the cell management component configured to generate cell management instructions to enable or disable the supplementary carrier.

41. The base station of claim 39, the communication component configured to facilitate communications with the access terminal via the anchor carrier and the supplementary carrier.

42. The base station of claim 41, the triggering algorithm generated to include instructions for the access terminal to detect the trigger events exclusively over the anchor carrier.

43. The base station of claim 42, the triggering algorithm generated to include instructions for the access terminal to report downlink measurements taken exclusively over the anchor carrier.

44. The base station of claim 42, the triggering algorithm generated to include instructions for the access terminal to report downlink measurements taken over the anchor carrier and the supplementary carrier.

45. The base station of claim 41, the triggering algorithm generated to include instructions for the access terminal to detect the trigger events over the anchor carrier and the supplementary carrier.

46. The base station of claim 45, the triggering algorithm generated to include instructions for the access terminal to ascertain an elapsed time between detecting a first trigger event and a second trigger event, wherein the access terminal is instructed to report downlink measurements associated with the second trigger event together with downlink measurements associated with the first trigger event only if the elapsed time does not exceed a time threshold.

47. The base station of claim 41, the triggering algorithm generated to include instructions for the access terminal to perform the following acts:
- temporarily disabling supplementary carrier reception; and
- taking the downlink measurements exclusively from the supplementary receiver; and
detecting trigger events exclusively over the supplementary receiver.

48. The base station of claim 41, the communication component further configured to utilize a common time reference for each of the anchor carrier and the supplementary carrier, wherein downlink transmissions via the anchor carrier are synchronized with downlink transmissions via the supplementary carrier.

49. A non-transitory computer-readable storage medium comprising:
- code for communicating with an access terminal via at least one of an anchor carrier or a supplementary carrier;
- code for generating a triggering algorithm, the triggering algorithm including instructions for the access terminal to report downlink measurements as a function of detecting trigger events via at least one of the anchor carrier, or the supplementary carrier;
- code for transmitting the triggering algorithm to the access terminal;
- code for receiving downlink measurements from the access terminal; and
- code for providing cell management instructions to the access terminal, the cell management instructions based in part on the downlink measurements.

50. An apparatus for facilitating managing cells in a multi-carrier system from a base station, comprising:
- means for communicating with an access terminal via at least one of an anchor carrier or a supplementary carrier;
- means for generating a triggering algorithm, the triggering algorithm including instructions for the access terminal to report downlink measurements as a function of detecting trigger events via at least one of the anchor carrier, or the supplementary carrier;
- means for transmitting the triggering algorithm to the access terminal;
- means for receiving downlink measurements from the access terminal; and
- means for providing cell management instructions to the access terminal, the cell management instructions based in part on the downlink measurements.

* * * * *